March 26, 1957   P. E. GISHLER ET AL   2,786,280
METHOD OF CONTACTING SOLID PARTICLES WITH FLUIDS
Filed March 12, 1954   3 Sheets-Sheet 1

Figure 1:
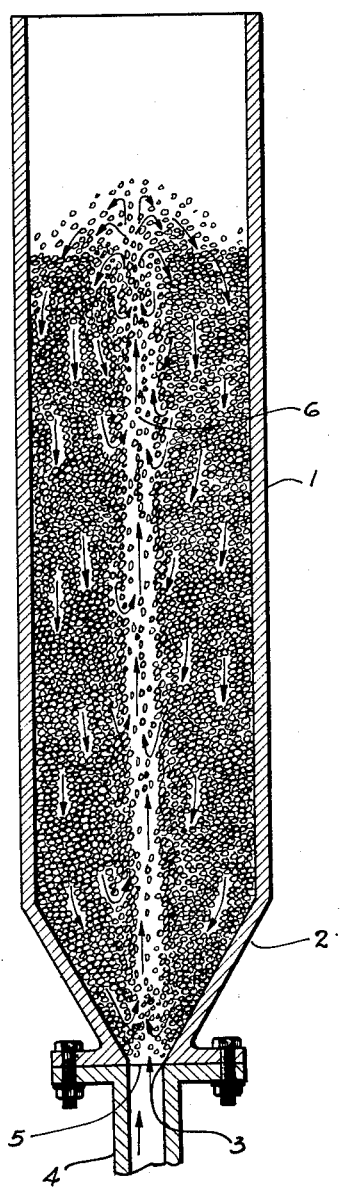

-Fig-1-

INVENTORS
Paul Ernest Gishler
Kishan Bahadur Mathur

BY
Bailey, Stephens, and Huettig
Attorneys

Influence of air velocity on bed behaviour for different bed heights in a 6" column air inlet 3/8" std.

March 26, 1957 P. E. GISHLER ET AL 2,786,280
METHOD OF CONTACTING SOLID PARTICLES WITH FLUIDS
Filed March 12, 1954 3 Sheets-Sheet 3

INVENTORS
Paul Ernest Gishler
Kishan Bahadur Mathur
BY
Bailey, Stephens, and Huettig
Attorneys

United States Patent Office 2,786,280
Patented Mar. 26, 1957

2,786,280

METHOD OF CONTACTING SOLID PARTICLES WITH FLUIDS

Paul Ernest Gishler, Ottawa, Ontario, and Kishan B. Mathur, Sarnia, Ontario, Canada, assignors to National Research Council, Ottawa, Ontario, Canada, a body corporate of Canada Application March 12, 1954, Serial No. 415,920

6 Claims. (Cl. 34—10)

The present invention is a novel method of contacting solid particles with fluids. The term "fluid" is used herein to include both liquids and gases, and the term "gas" to include vapours. The invention is more generally applicable to the contacting of solid particles with gases and a common example of this is the drying of wheat with a drying gas such as heated air.

Hitherto there have been three main methods used in the contacting of solid particles with gases "without the use of internal or external mechanical devices for causing agitation." These three methods are commonly termed "fluidization," "packed bed," and "moving bed."

In fluidization, a mass of the solid particles is placed in a vertically disposed vessel and the gas is passed substantially uniformly upward through the mass at a velocity sufficient to counteract the gravity of the solid particles and hold them in a suspended, apparently almost weightless, condition. The passage of the gas causes agitation of the suspended particles and the mass resembles a boiling liquid. This resemblance to a liquid is heightened by the fact that the hand can be passed through the mass with the greatest facility. By suitable adjustment of the gas velocity, the mass can be caused to circulate in a manner similar to convection in a liquid.

One important limitation of fluidization is that it is extremely difficult to fluidize solid particles having a size coarser than 20 mesh especially if the particles are of a uniform size. For example, it cannot practicably be applied to wheat kernels which are usually about ¼" x ⅛" in size. In addition, countercurrent flow is limited and haphazard.

The packed bed method is an old technique in which the gas is merely passed either vertically upwards or vertically downwards through a packed bed of the solid particles. The disadvantages of this method are well known and obvious. The material cannot readily be fed into and discharged from a packed bed continuously and the method therefore is confined to batch operation. Furthermore, the absence of agitation and intermingling of the solid particles in the bed causes wide gradients of condition, such as temperature, in the bed. Large temperature differences are an indication of poor heat transfer.

The moving bed technique is widely used, especially for particle sizes which are too coarse for good fluidization. It provides effective contact between the gas and solids because of countercurrent flow and is inherently suitable for continuous operation. Its major disadvantage is the absence of agitation between the particles with the result that there are wide gradients of conditions, such as temperature, in the bed due to relatively poor heat transfer. A further disadvantage is the need for some external method of conveying the stream of solids from the base of the reaction vessel back to the top of the moving bed.

It is the object of the present invention to avoid or reduce the above-mentioned disadvantages of the old methods, this being effected by an entirely different technique.

According to the present invention, the method comprises directing a jet of the fluid substantially vertically up through a mass of the solid particles to form a well defined, continuous, relatively rapidly moving upward spout of solid particles in that portion of the mass lying adjacent to the general line of direction of said jet and a steady, continuous, relatively slow downward movement of the particles in the remainder of said mass whereby the mass as a whole is in continual circulation, said downwardly moving particles continuously migrating to, and being upwardly spouted in, said spout at all levels along the height of said spout.

To cause this spouting within the mass of solid particles, the diameter of the fluid inlet aperture and the fluid flow in the jet must be correctly related to the size of the particles and the dimensions of the mass for a given solid and fluid. The correlation of these factors is discussed more fully hereinafter.

It is generally of importance to ensure that all the particles in the mass receive substantially the same degree of contact with the fluid. In order to achieve this, it is normally desirable that the jet be directed up substantially through the centre of the mass. Further uniformity of contact can be obtained by utilizing a substantially cylindrical mass of particles.

Figure 2:
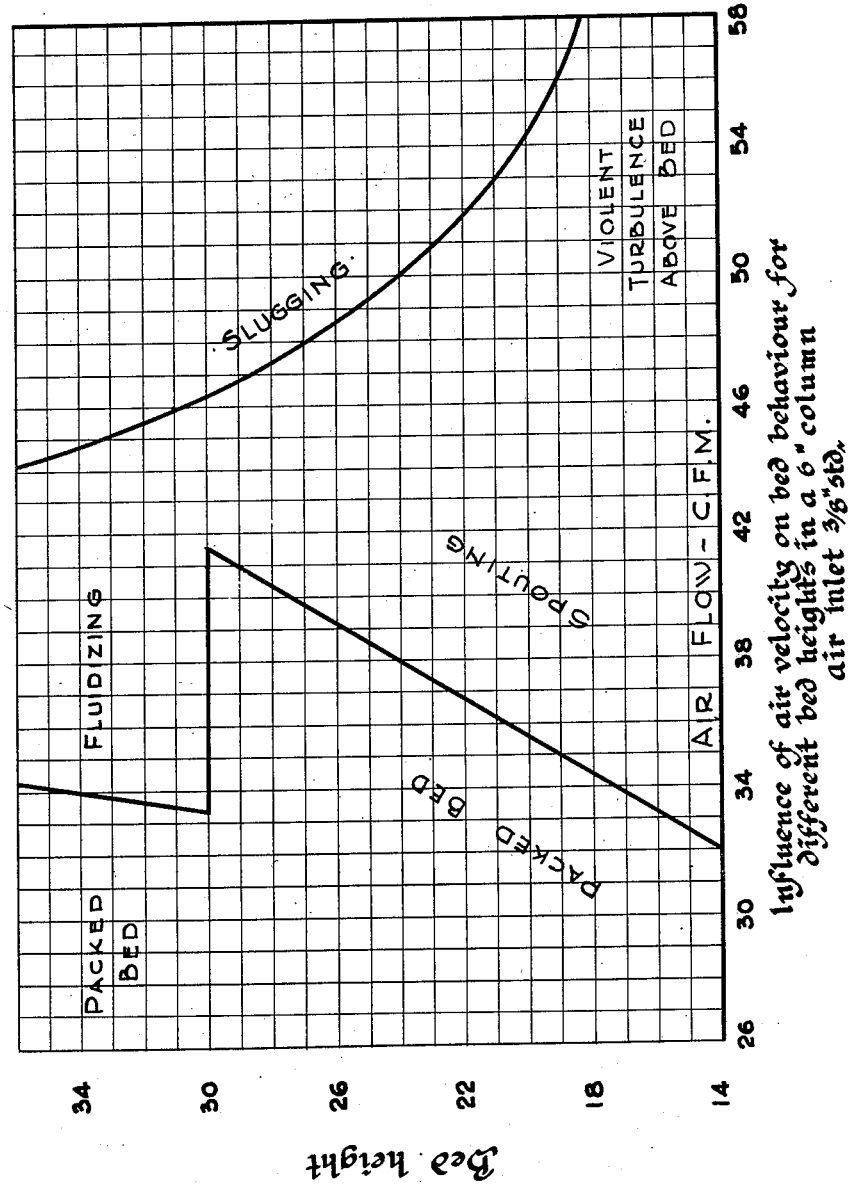
Figure 3:
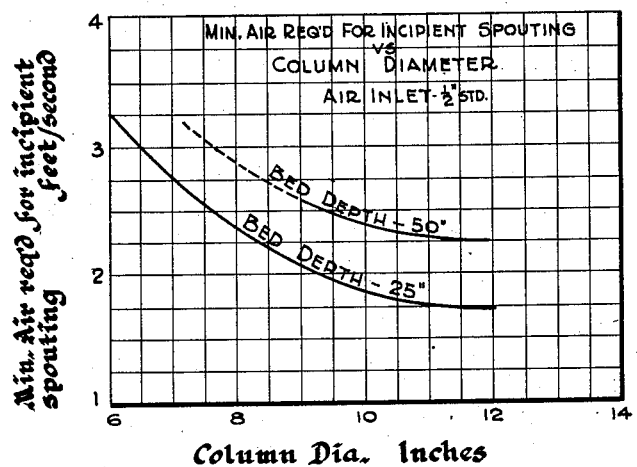
Figure 4:
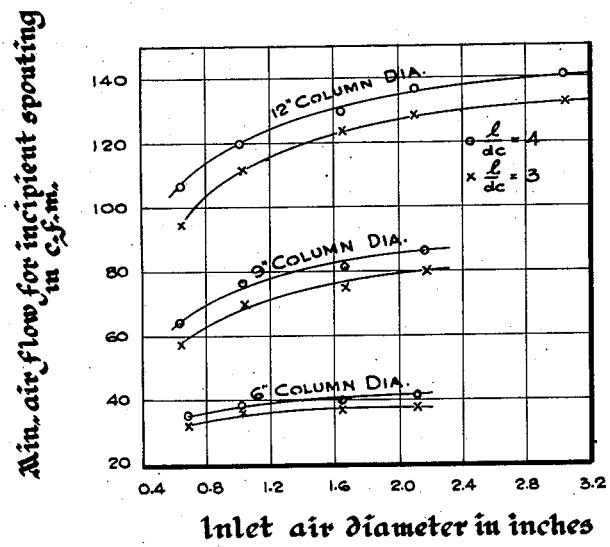

The invention is illustrated in the accompanying drawings in which:

Figure 1 is a vertical section of an apparatus in operation for drying of wheat, and Figures 2, 3 and 4, are graphs indicating the correlation of the various factors involved with the present invention.

Figure 1 shows an open-topped cylindrical vessel 1 having a bottom extension 2 in the form of an inverted cone. An aperture 3 is provided in the bottom of the extension 2 and connected to an air inlet pipe 4. In actual fact the aperture 3 causes the extension 2 to be in the shape of a frustro-cone but this shape is herein referred to, for convenience, as an inverted cone. A screen 5 is fitted across the aperture 3 solely for the purpose of preventing wheat entering the pipe 4. For continuous operation the cylindrical vessel would be equipped with a solids inlet pipe and an overflow pipe. These have been omitted from the drawing as they do not influence the movement of the particles within the vessel.

In operation, the vessel 1 is filled, for example, with wheat to a bed depth not exceeding a certain maximum value discussed hereinafter. Air is introduced through the pipe 4 to form a jet issuing from the aperture 3 and directed centrally upward through the wheat. Provided that the air flow is within a certain range of values, to be discussed hereinafter, a spout 6 will be formed in a central core of the mass of wheat as indicated in Figure 1. The illustration represents the appearance of the phenomenon substantially as has been determined photographically on a split column. The cylindrical wall of the spout or core 6 is surprisingly distinct and has a diameter which does not greatly vary from bottom to top.

It is a somewhat surprising fact that, whereas the air flow at the bottom of the vessel 1 is substantially confined to the spout 6, only a portion, generally less than half and in some cases less than one quarter, of the air flow is confined to the spout 6 at the top. Thus there is a continual migration of the air into the mass of particles surrounding the core as the air proceeds up the spout 6, and the air-wheat contact is therefore not confined to the spout 6. The passage of air through the wheat surrounding the spout 6 is not sufficient, however, to cause fluidization thereof, since it retains essentially the characteristics of a moving packed bed.

The term "spouting" is used in its true sense and indicates a very rapid upward movement of the particles as is shown in Figure 1. As is also indicated, the force of the spout 6 causes a fountain of the particles at the top of the bed and the particles fall from this fountain onto the outer portion of the bed surrounding the spout 6. There is a steady downward movement of the particles in this outer or annular portion of the bed, e. g. at a rate of about one to two inches per second. At the same time, the particles are continually tending to be drawn towards the spout 6 during their passage in packed form down the vessel 1. Some that reach the periphery of the spout are picked up by the fluid stream and carried to the top of the bed, others continue vertically downward as part of the annulus. The extent of the lateral movement varies, and depends on such factors as particle shape, bed diameter and fluid velocity. For example, peas show a tendency to travel vertically downwards with a minimum of lateral flow, the bulk of the peas travelling the full length of the vessel before entering the spout.

A substantial portion of the wheat also reaches the bottom of the vessel 1 where it is drawn into the spout 6 by virtue of the steep wall of the conical extension 2. If it were not for this conical extension 2, there would be a dead space at the bottom of the vessel 1 where wheat would lie uncirculated. In a large unit this dead space can so interfere with particle flow as to make successful spouting very difficult, if not impossible. Normally, therefore, the conical extension will be required and, moreover, the wall thereof will be steeper than the angle of free repose of the particles under the conditions concerned. This latter angle is found to vary under different conditions, particularly with different column diameters of the vessel 1. The criterion, however, is quite clear that the cone wall should be steep enough to allow the particles to move downward and inward towards the spout and this can readily be effected by adjustment under the particular conditions concerned. It is found that an included angle of the cone wall of 85° is satisfactory for a one foot column diameter but that this angle should be reduced substantially for a two foot column diameter. In this latter instance a 45° angle was found satisfactory.

The apparatus of Figure 1 has been described in relation to the drying of wheat with air. It may be used for many other purposes, however, involving contact of solid particles with fluids, and spouting has been obtained in a wide variety of cases put into actual practice. It has been found however that comparatively coarse and uniform particles can be made to spout more readily than fine particles or particles which have a wide range of particle sizes. Good spouting has been obtained with a great variety of particles of 35 mesh and coarser, even considerably coarser than 1 mesh, but generally speaking, the most satisfactory spouting is obtained with a mass of particles substantially all of which are of 4–20 mesh.

Mixtures of narrow cuts of sizes varying widely in diameter like sand and wheat, could be spouted effectively but it was found difficult to spout solids having a wide and gradual size distribution.

The conditions necessary to achieve the spouting in accordance with the present invention will now be discussed in particular relation to an apparatus such as is shown in Figure 1, having a cylindrical column and a fluid inlet aperture at the bottom. Although it has been found possible, simultaneously, to produce several independent spouts within the same bed, and also to produce spouts of varying shape, the description of spouting will be limited to that of a single spout within a cylindrical column using air as the contacting fluid, although the appended claims cover the use of a plurality of jets to produce a plurality of spouts and the use of a vessel of any shape.

For a given solid, fluid and column diameter, there is a maximum fluid inlet size and maximum bed depth above which spouting cannot be obtained. For example, with wheat and air, the maximum bed depth which can be spouted in a 4 inch diameter vessel is only about 14 inches whereas in a 12 inch diameter vessel a bed depth of about 100 inches can be spouted. A large number of tests have been made with varying column diameters and air inlet diameters, using wheat and air, and the following relationship is found to exist when using optimum air flow:

$$\frac{l^{0.7} \max}{d_c} = \phi\left(\frac{d_i^{0.6}}{d_c}\right)$$

where $l$ max = maximum spoutable bed depth, inches,
$d_c$ = column diameter, inches,
$d_i$ = air inlet diameter, inches.

Once the desired column and fluid inlet diameters have been decided and the vessel constructed accordingly, the main variables, for a given solid and fluid, are the bed depth and the fluid flow. These latter two factors are therefore the chief factors to be discussed. In practice, one requires to know the maximum bed depth which can be spouted in order to decide on a depth at or below this value, and to know the minimum fluid flow required to cause incipient spouting. These factors have been determined for a number of solids in the following table, air being the fluid used and the column diameter being 6 inches and the air inlet being a ⅜" standard pipe (approximately ½" actual inside diameter):

| No. | Material | Size, Inches | Bulk Density, lbs./c. ft. | Absolute Density, lbs./c. ft. | Max. Spoutable Bed Depth, Inches | Air Flow For Incipient Spouting, F. P. S., Superficial |
| --- | --- | --- | --- | --- | --- | --- |
| 1 | Brucite | 0.0232 | 74.7 | 156.5 | 27.5 | 0.56 |
| 2 | Coffee Beans | 0.3 x 0.45 | 24.8 | 39.5 | 20.0 | 3.22 |
| 3 | Lima Beans | 0.5 x 0.75 | 47.2 | 83.0 | 11.4 | 4.43 |
| 4 | Mustard Seeds | 0.0855 | 44.5 | 75.7 | 34.0 | 2.57 |
| 5 | Rape Seeds | 0.0691 | 41.6 | 68.9 | 30.0 | 2.01 |
| 6 | Sunflower Seeds | 0.315 x 0.473 | 24.6 | | 15.0 | 3.06 |
| 7 | Oats | 0.118 x 0.394 | 38.3 | | 19.0 | 2.42 |
| 8 | Wheat | 0.125 x 0.25 | 51.3 | 85.9 | 30.0 | 3.53 |
| 9 | Peas | 0.25 | 49.4 | 86.6 | 12.0 | 5.31 |
| 10 | Ottawa Sand (−20+35) | 0.0232 | 100.0 | 145.0 | 27.0 | 0.75 |
| 11 | Shale (−14+20) | 0.0390 | 49.2 | 128.8 | 36.0 | 1.21 |
| 12 | Gravel (−4+8) | 0.139 | 93.2 | 166.6 | 25.0 | 4.31 |
| 13 | Gravel (−8+14) | 0.0695 | 93.2 | 164.0 | 46.0 | 3.27 |
| 14 | Gravel (−14+20) | 0.0394 | 93.2 | 160.0 | | |

The graph illustrated in Figure 2 shows the effect of bed depth and air flow on a mass of wheat in a vessel of 6" column and ⅜" standard air inlet diameter. It will be seen that spouting can only be obtained in a limited range of these two factors plotted and that no spouting can be obtained above a bed depth of 30". With a bed depth below this value and gradually increasing the air flow from zero, it will be seen that the bed remains packed until a certain air flow is reached when spouting commences. Spouting is maintained over a further increase in air flow until a value of the latter is reached above which the bed begins to "slug." This latter is an expression commonly used in the art and indicates a violent reciprocating motion together of a large number of particles. At low bed depths, increase of air flow converts spouting to violent fluidizing which is as undesirable as slugging.

The graph illustrated in Figure 3 plots the minimum linear superficial air velocity, termed "minimum air" for brevity in Figure 3, required for incipient spouting against column diameter. Two curves are given, one for a bed depth of 25" and one for a bed depth of 50". These curves are obtained for an air inlet diameter equal to that of a ½" standard pipe using wheat as the solid. These curves show that lower linear superficial air velocities are required for larger column diameters.

The following general formula has been derived for correlating, with reasonable technical accuracy, the main variables involved in the present technique. The fluid flow required to cause incipient spouting under a very wide range of physical conditions may readily be calculated from this simple formula, when dimensionally consistent terms are used, for example all terms being in the c. g. s. system or the British F. P. S. system:

$$V_i = K \frac{d_p d_c}{d_i^2} \sqrt{\frac{2gl(\rho_s - \rho_f)}{\rho_f}}$$

where $V_i$ = linear velocity of inlet fluid.
$K$ = substantially 0.46 for substantially spherical particles and substantially 0.28 for other particles.
$d_p$ = particle diameter.
$d_c$ = column diameter.
$d_i$ = fluid inlet diameter.
$g$ = gravitational constant.
$l$ = bed depth.
$\rho_s$ = absolute density of solid.
$\rho_f$ = absolute density of fluid.

This formula shows the dependence of $V_i$ on six independent factors where each factor has been varied over a wide range. For example fluids have been varied in density from that of air to that of water, and particle sizes and densities of solids have been varied from those of lima beans to those of sand. Wide variations of the other factors have also been found to apply. Further refinements to the formula, such as the introduction of a more accurate shape factor, or the addition of terms to show more precisely how $l$ for example can influence the value of the exponent of $d_c$, could be made, but these refinements have been omitted in order that the formula be not unduly complicated.

In the particular case of using air as the fluid, with a 6" diameter column and a ⅜" standard air inlet diameter, the following simpler formula has been found to apply:

$$Q = 614(d_p)(l^{1/2})(s^{1/3})$$

where $Q$ = minimum air flow required for incipient spouting, cu. ft./min.
$d_p$ = particle diameter, feet.
$l$ = bed depth, feet.
$s$ = absolute density of solids, lbs./cu.ft.

Having obtained the value of Q from this latter given formula, the flow for other inlet air diameters can be predicted by using the curves in Figure 4. This figure shows the variation of Q with inlet diameter $d_i$ for 6", 9", and 12" diameter column sizes. On the basis of this graph, it is found that Q is substantially proportional to a value of $d_i$ which is of the order of $d_i^{0.13}$. This latter value varies slightly with various column diameters as will be seen from the curves.

The solids undergoing spouting in any vessel are subjected to two forms of motion. They pass steadily downwards as a well defined packed annulus and then they are picked up in the spout and are carried rapidly to the surface of the bed ready to begin another cycle. The constant downward travel at the walls of the vessel indicate a rapid turnover of solids. Many factors influence the rate of turnover such as particle size, vessel diameter, bed depth and air velocity. It has been found that, in a one foot diameter vessel, wheat may be cycled at a rate of about 10 tons/hour.

The neat and uniform agitation and movement of the spouted bed indicated in Figure 1 provides numerous advantages not hitherto obtained with previous techniques. Good control is possible since the condition of the bed may be closely regulated at all times. Uniform temperatures can readily be maintained due to the excellent heat and mass transfer. Furthermore, the process lends itself well to continuous operation and the solid particles may readily be fed in and drawn off continuously.

The bulk of the bed is moving steadily downward in the non-spouted portion and this provides counter-current contact with the upwardly moving fluid. Finally, the technique of the present invention provides a method of handling particles too coarse for effective fluidization.

We claim:

1. A method of contacting solid particles with a fluid comprising directing a jet of fluid substantially vertically up through a bed of the solid particles to carry said particles in dilute suspension upwardly and thus forming, as the minor volume of the bed, a well-defined continuous relatively rapid upward spout lying adjacent the general line of direction of said jet, said upwardly carried material then falling downwardly and outwardly to form, as the major volume of said bed, a downwardly relatively slowly moving annular columnar loosely packed body, the depth of said bed being substantially greater than the diameter of said columnar body, the downwardly moving particles of said columnar body following substantially vertical downward paths having a slight inward inclination and thereby continuously migrating to, and being upwardly spouted in, said spout at all levels along the height of said spout.

2. A method of contacting solid particles with a fluid comprising directing a jet of the fluid issuing from an aperture substantially vertically up through substantially the centre of a bed of the solid particles, said bed being substantially in the shape of a vertically disposed cylinder, the fluid flow being such as to satisfy the formula $$V_i = K \frac{d_p d_c}{d_i^2} \sqrt{\frac{2gl(\rho_s - \rho_f)}{\rho_f}}$$

where $V_i$ = linear velocity of inlet fluid.
$K$ = substantially 0.46 for substantially spherical particles and substantially 0.28 for other particles.
$d_p$ = particle diameter.
$d_c$ = column diameter.
$d_i$ = fluid inlet diameter.
$g$ = gravitational constant.
$l$ = bed depth.
$\rho_s$ = absolute density of solid.
$\rho_f$ = absolute density of fluid.

said terms being dimensionally consistent, whereby to cause continuous upward spouting of the particles in a substantially central core of the bed and continuous downward movement of the particles in the portion of the bed surrounding said core, whereby the bed as a whole is in continual circulation, said downwardly moving particles continuously migrating to, and being upwardly spouted in, said core at all levels along the height of said core.

3. A method of contacting solid particles with a fluid, a bed of said particles being contained in a substantially cylindrical, vertically disposed vessel having a bottom extension substantially in the shape of an inverted cone, the wall of said conical extension being steeper than the angle of free repose of said particles under the conditions concerned, comprising directing a jet of the fluid vertically upward through an aperture in the bottom of said conical extension, the fluid flow being such as to satisfy the formula $$V_i = K \frac{d_p d_c}{d_i^2} \sqrt{\frac{2gl(\rho_s - \rho_f)}{\rho_f}}$$

where $V_i$ = linear velocity of inlet fluid.
$K$ = substantially 0.46 for substantially spherical particles and substantially 0.28 for other particles.
$d_p$ = particle diameter.
$d_c$ = column diameter.
$d_i$ = fluid inlet diameter.
$g$ = gravitational constant.
$l$ = bed depth.
$\rho_s$ = absolute density of solid.
$\rho_f$ = absolute density of fluid.

said terms being dimensionally consistent, whereby to cause continuous upward spouting of the particles in a substantially central core of the bed and continuous downward movement of the particles in the portion of the bed surrounding said core whereby the bed as a whole is in continual circulation, said downwardly moving particles continuously migrating to, and being upwardly spouted in, said core at all levels along the height of said core.

4. A method as claimed in claim 3 in which the fluid is a gas.

5. A method as claimed in claim 3 in which the solid is wheat and the fluid is a drying gas.

6. A method as claimed in claim 3 in which the size of substantially all of the solid particles is in the range of 4–20 mesh.

References Cited in the file of this patent

UNITED STATES PATENTS

| | | |
|---|---|---|
| 83,255 | Chichester | Oct. 20, 1868 |
| 1,094,452 | Mayo et al. | Apr. 28, 1914 |
| 1,648,005 | Pritchard | Nov. 8, 1927 |
| 1,703,654 | Becker | Feb. 26, 1929 |
| 1,766,030 | Meakin | June 24, 1930 |
| 1,869,949 | Szikla et al. | Aug. 2, 1932 |
| 2,435,927 | Manning et al. | Feb. 10, 1948 |
| 2,437,694 | Hickman | Mar. 16, 1948 |
| 2,478,912 | Garbo | Aug. 16, 1949 |
| 2,513,370 | Shaw | July 4, 1950 |
| 2,550,722 | Rollman | May 1, 1951 |
| 2,689,973 | Lee et al. | Sept. 28, 1954 |